(12) United States Patent
Venkatachalam et al.

(10) Patent No.: US 9,629,075 B2
(45) Date of Patent: Apr. 18, 2017

(54) DISTRIBUTED MOBILITY ANCHORING FOR WIRELESS NETWORKS

(71) Applicant: Intel Corporation, Santa Clara, CA (US)

(72) Inventors: Muthaiah Venkatachalam, Beaverton, OR (US); Donghoon Shin, Lafayette, IN (US); Danny Moses, Reut (IL); Yang-Seok Choi, Portland, OR (US); Vallabhajosyula S. Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 14/806,353

(22) Filed: Jul. 22, 2015

(65) Prior Publication Data

US 2015/0327051 A1    Nov. 12, 2015

Related U.S. Application Data

(62) Division of application No. 13/942,060, filed on Jul. 15, 2013, now Pat. No. 9,119,136.

(Continued)

(51) Int. Cl.
*H04W 8/08* (2009.01)
*H04W 48/16* (2009.01)
(Continued)

(52) U.S. Cl.
CPC ............ *H04W 48/16* (2013.01); *H04B 7/024* (2013.01); *H04W 8/02* (2013.01); *H04W 8/085* (2013.01);
(Continued)

(58) Field of Classification Search
None
See application file for complete search history.

(56) References Cited

U.S. PATENT DOCUMENTS

| 7,299,046 B1 * | 11/2007 | Ozugur | H04W 8/02 370/328 |
| 7,593,722 B2 * | 9/2009 | Jagadeesan | H04W 8/12 455/418 |

(Continued)

OTHER PUBLICATIONS

S. Pack et al., A performance comparison of mobility anchor point selection schemes in Hierarchical Mobile IPv6 networks, Computer networks, (2006), doi:10.1016/j.comnet.2006.002, 13 pages.*

*Primary Examiner* — Bunjob Jaroenchonwanit
(74) *Attorney, Agent, or Firm* — Alpine Technology Law Group LLC (57) ABSTRACT

A method and an information handling system configured to select a mobility anchor point for a mobile device in a distributed mobility anchor point network may comprise collecting information about movement behavior or data transfer behavior of the mobile device, or tunneling overhead of two or more base stations. A mobility anchor point associated with a first base station may be assigned to the mobile device if the mobile device is connected to the first base station for at least a predetermined amount of time, if the mobile device transfers at least a predetermined amount of data via the first base station, or device if a tunneling overhead of the first base station is less than a predetermined level. In some embodiments, a centralized mobility anchor may be assigned to the mobile device if the mobile device is highly mobile and there is no identified base station to which the mobile device is frequently connected.

15 Claims, 6 Drawing Sheets

Related U.S. Application Data (60) Provisional application No. 61/674,274, filed on Jul. 20, 2012.

(51) Int. Cl.

| | | |
|---|---|---|
| *H04W 48/00* | (2009.01) | |
| *H04W 40/20* | (2009.01) | |
| *H04W 36/34* | (2009.01) | |
| *H04B 7/024* | (2017.01) | |
| *H04W 60/00* | (2009.01) | |
| *H04W 36/00* | (2009.01) | |
| *H04W 8/02* | (2009.01) | |
| *H04W 48/18* | (2009.01) | |
| *H04W 36/08* | (2009.01) | |
| *H04W 80/04* | (2009.01) | |
| *H04W 84/12* | (2009.01) | |

(52) U.S. Cl.
CPC ....... *H04W 36/0016* (2013.01); *H04W 36/34* (2013.01); *H04W 40/20* (2013.01); *H04W 48/17* (2013.01); *H04W 48/18* (2013.01); *H04W 60/00* (2013.01); *H04W 36/08* (2013.01); *H04W 80/04* (2013.01); *H04W 84/12* (2013.01)

(56) References Cited

U.S. PATENT DOCUMENTS

| | | | | |
|---|---|---|---|---|
| 7,610,049 | B2* | 10/2009 | Watanabe | H04W 36/0011 370/328 |
| 8,599,790 | B1* | 12/2013 | Damle | H04W 76/022 370/331 |
| 8,812,871 | B2* | 8/2014 | Monclus | G06F 21/53 713/189 |
| 8,862,124 | B2* | 10/2014 | Navali | H04W 36/0033 370/230 |
| 2001/0046223 | A1* | 11/2001 | Malki | H04L 45/00 370/338 |
| 2002/0199104 | A1* | 12/2002 | Kakemizu | H04L 63/08 713/168 |
| 2003/0185196 | A1* | 10/2003 | Venkitaraman | H04W 24/04 370/351 |
| 2004/0049532 | A1* | 3/2004 | Oka | H04W 4/16 709/202 |
| 2004/0235472 | A1* | 11/2004 | Fujishima | H04B 7/0408 455/434 |
| 2004/0246933 | A1* | 12/2004 | Valko | H04L 29/06 370/338 |
| 2005/0259663 | A1* | 11/2005 | Ode | G03C 7/39296 370/395.4 |
| 2006/0040663 | A1* | 2/2006 | Ise | H04W 88/08 455/434 |
| 2006/0117111 | A1* | 6/2006 | Sudo | H04W 8/085 709/238 |
| 2006/0185013 | A1* | 8/2006 | Oyama | H04L 63/08 726/21 |
| 2007/0008906 | A1* | 1/2007 | Han | H04L 29/12009 370/254 |
| 2007/0014262 | A1* | 1/2007 | Gras | H04L 45/50 370/331 |
| 2007/0025292 | A1* | 2/2007 | Maksymczuk | H04W 24/10 370/331 |
| 2007/0121497 | A1* | 5/2007 | Ang | H04L 12/14 370/229 |
| 2007/0232322 | A1* | 10/2007 | Jagadeesan | H04W 8/12 455/456.1 |
| 2007/0253372 | A1* | 11/2007 | Nakayasu | H04W 36/30 370/331 |
| 2008/0031212 | A1* | 2/2008 | Ogura | H04W 28/16 370/338 |
| 2008/0139147 | A1* | 6/2008 | Wu | H04L 63/08 455/187.1 |
| 2008/0225806 | A1* | 9/2008 | Arian | H04W 8/065 370/338 |
| 2008/0297847 | A1* | 12/2008 | Yamazaki | G06F 17/50 358/1.15 |
| 2009/0010206 | A1* | 1/2009 | Giaretta | H04W 8/005 370/328 |
| 2009/0067366 | A1* | 3/2009 | Aust | H04W 76/023 370/328 |
| 2009/0163203 | A1* | 6/2009 | Stojanovski | H04W 8/087 455/432.3 |
| 2009/0197646 | A1* | 8/2009 | Tamura | H04B 7/022 455/561 |
| 2009/0290540 | A1* | 11/2009 | Cherian | H04L 47/10 370/328 |
| 2009/0303914 | A1* | 12/2009 | Gonsa | H04L 12/189 370/312 |
| 2010/0008319 | A1* | 1/2010 | Awano | H04L 47/10 370/329 |
| 2010/0027508 | A1* | 2/2010 | Jee | H04W 36/0011 370/331 |
| 2010/0046434 | A1* | 2/2010 | Weniger | H04W 8/06 370/328 |
| 2010/0056175 | A1* | 3/2010 | Bachmann | H04W 8/08 455/456.1 |
| 2010/0098021 | A1* | 4/2010 | Stammers | H04W 36/0033 370/331 |
| 2010/0177686 | A1* | 7/2010 | Abeille | H04W 40/36 370/328 |
| 2010/0184436 | A1* | 7/2010 | Tachikawa | H04W 36/22 455/436 |
| 2010/0246532 | A1* | 9/2010 | Olvera-Hernandez | H04W 36/005 370/331 |
| 2010/0254347 | A1* | 10/2010 | Muhanna | H04W 36/0016 370/331 |
| 2010/0272063 | A1* | 10/2010 | Kato | H04W 8/082 370/331 |
| 2010/0315992 | A1* | 12/2010 | Turanyi | H04W 8/082 370/315 |
| 2011/0080872 | A1* | 4/2011 | Chan | H04W 8/082 370/328 |
| 2011/0110328 | A1* | 5/2011 | Pradeep | H04W 36/0022 370/331 |
| 2011/0116450 | A1* | 5/2011 | Hirano | H04W 12/06 370/328 |
| 2011/0191494 | A1* | 8/2011 | Turanyi | H04W 36/0027 709/242 |
| 2011/0216680 | A1* | 9/2011 | Vogt | H04W 60/005 370/310 |
| 2011/0269499 | A1* | 11/2011 | Vikberg | H04W 28/08 455/524 |
| 2011/0286395 | A1* | 11/2011 | Liebsch | H04W 40/18 370/328 |
| 2011/0289219 | A1* | 11/2011 | Braudes | H04L 65/1083 709/227 |
| 2012/0134346 | A1* | 5/2012 | Bosch | H04W 8/085 370/338 |
| 2012/0155442 | A1* | 6/2012 | Haddad | H04W 8/065 370/338 |
| 2012/0166617 | A1* | 6/2012 | Chang | H04W 76/02 709/224 |
| 2012/0178379 | A1* | 7/2012 | Chen | H04W 52/0206 455/68 |
| 2012/0190366 | A1* | 7/2012 | Keller | H04W 36/0022 455/436 |
| 2012/0201186 | A1* | 8/2012 | Awano | H04L 12/1877 370/312 |
| 2012/0202493 | A1* | 8/2012 | Wang | H04W 60/00 455/435.1 |
| 2012/0257566 | A1* | 10/2012 | Le | H04L 45/308 370/328 |
| 2012/0290699 | A1* | 11/2012 | Zhang | H04W 8/26 709/223 |
| 2012/0302196 | A1* | 11/2012 | Chin | H04L 65/1073 455/404.1 |

(56) References Cited

U.S. PATENT DOCUMENTS

| | | | | |
|---|---|---|---|---|
| 2013/0044682 A1* | 2/2013 | Qiang | ............... | H04W 8/085 |
| | | | | 370/328 |
| 2013/0051361 A1* | 2/2013 | Yokoyama | .......... | H04W 76/002 |
| | | | | 370/331 |
| 2013/0237224 A1* | 9/2013 | Fujino | ............... | H04W 60/00 |
| | | | | 455/435.1 |
| 2014/0106736 A1* | 4/2014 | Olson | ............... | H04W 24/10 |
| | | | | 455/422.1 |
| 2014/0301200 A1* | 10/2014 | Miura | ............... | H04W 28/08 |
| | | | | 370/235 |
| 2014/0341109 A1* | 11/2014 | Cartmell | ............ | H04L 45/308 |
| | | | | 370/328 |
| 2014/0370902 A1* | 12/2014 | Kim | .................. | H04W 36/24 |
| | | | | 455/438 |
| 2015/0081860 A1* | 3/2015 | Kuehnel | ............ | H04L 41/0806 |
| | | | | 709/222 |

* cited by examiner

DISTRIBUTED MOBILITY ANCHORING FOR WIRELESS NETWORKS

CROSS-REFERENCE TO RELATED APPLICATIONS

The present application is a divisional of U.S. application Ser. No. 13/942,060 filed Jul. 15, 2015, pending, which in turn claims the benefit of U.S. Application No. 61/674,274 filed Jul. 20, 2012. Said application Ser. No. 13/942,060 and said Application No. 61/674,274 are hereby incorporated herein in their entireties.

BACKGROUND

In order to be able to transfer packets to and from remote devices, a communication device uses the Internet Protocol (IP) address of the destination to designate to where the packet should be transferred and its own IP address to indicate to the remote device where to send the reply packets, if any. As a result, each device is assigned an IP address when connecting to a network. The IP address comprises a network portion and host or device portion. The network portion is assigned according to the network to which the device is directly connected, and the host portion is a unique value within that local network.

In mobile networks, mobile devices are connected to an access network via a radio link with a base station. The base station provides a radio link for connecting with several mobile devices that are in its coverage area. The base station in turn is connected through an IP connection to an access network. The access network is connected via edge routers to the Internet, thus providing connectivity for the mobile devices to any device that is connected to the Internet.

Mobile devices are unique in the sense that when moving they may leave the coverage area of one base station and arrive in the coverage area of a different base station which may result in the mobile device being connected to a different local area network. The movement of the mobile device between base stations may result in a clash between the network address of the new local area network and the address part of the IP address of the mobile device. The clash should be resolved in order to maintain the ability of the mobile device to transmit and receive packets.

One solution for this clash is to assign a new IP address to the mobile device when it connects to a new base station where the network part of the new address is aligned with the new local area network address. This solution may be problematic in that changing the IP address of a mobile device in the middle of a session involves various complex operations to enable the continuation of established connections between the mobile device and other devices.

Another resolution of the clash may involve using Proxy Mobile IP protocol (PMIP) where the packets are tunneled between the base station and a Mobility Anchor Point (MAP) as the packets are transferred to and from the edge router and Internet. When a tunnel is created, a special IP address is used to transfer the packets between the MAP and the base-station through which the mobile device is connected. When the packets enter the tunnel, the packet is encapsulated with an additional IP header containing the tunnel IP address, and when the packet reaches the other endpoint of the tunnel, the extra header is removed (decapsulated). In this approach, the source and destination devices are able to communicate regardless of the actual base station being used by the mobile device. When the mobile device moves, a handover operation occurs between the original base station through which the mobile device had originally connected to the network and the new base station through which the device is currently connected to the network. The handover operation includes among other operations, the setting of a new tunnel between the MAP and the new base station for all traffic related to the IP address of the mobile device. The handover mechanism enables a mobile device to continue its communication without having to change its IP address. Moreover, this mechanism is transparent to the mobile device and to the peer devices with which the mobile device communicates with.

Utilization of a centralized MAP may introduce some limitations. First, all IP address allocations for all connecting mobile devices are performed by a single device, the MAP, which handles control traffic requesting a new IP address and the resulting reply between the base stations and the MAP. Second, all data traffic between the mobile devices and their destination devices in the Internet are routed through a single central device, the MAP. Third, all packets transferred to and from the base station are tunneled resulting in an increase of overhead bytes as a result of the encapsulation that takes place. Fourth, the MAP requires extra processing power to encapsulate and decapsulate all packets arriving from and to the base stations. Fifth, the need to route all traffic through the MAP may lead to non-optimized routs, for example, when both the source and destination devices are in the same access network. Although traffic could be routed directly between them, it is still routed through the MAP using tunnels between the MAP and each device.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
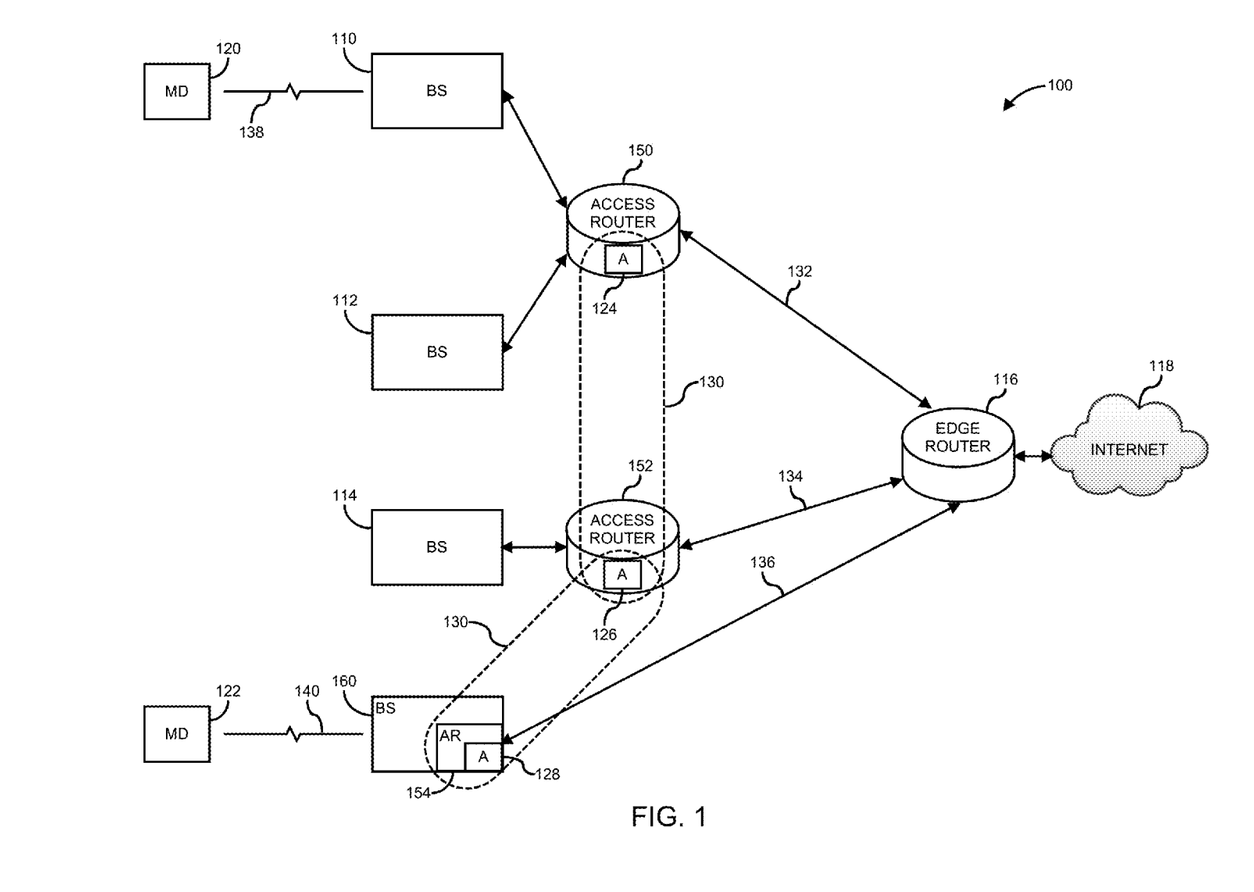
FIG. 1 is a diagram of a wireless network including distributed mobility anchor functionality in accordance with one or more embodiments.

Referring now to FIG. 1, a diagram of a wireless network including distributed mobility anchor functionality in accordance with one or more embodiments will be discussed. As shown in FIG. 1, a wireless network 100 may comprise one or more base stations (BS) such as base station 110, base station 112, base station 114 and base station 160 coupled to an edge router 116 either via one or more access routers such as access router 150, access router 152 or access router 154. As shown in FIG. 1, an access router may be located at a different geographical location from the base stations, or may be collocated with a base station such as access router 154 being collocated with base station 160. The base stations and access routers are ultimately coupled to edge router 116 via link 132, link 134 or link 136. The base stations may serve one or mobile devices (MD) such as mobile device 120 and mobile device 122. As shown, mobile device 120 may communicate with base station 110 via wireless link 138, and mobile device 122 may communicate with base station 160 via wireless link 140. The mobile devices may communicate with a network such as the Internet 118 via the base stations, access routers and edge router 116. In one or more embodiments, network 100 may be in compliant with an Institute of Electrical and Electronics Engineers (IEEE) standard such as an IEEE 802.16e standard to implement a Worldwide Interoperability for Microwave Access (WiMAX) network or an IEEE 802.16m standard to implement a WiMAX II standard. In such embodiments, a base station may be referred to as a WiMAX base station and a mobile device may be referred to as a mobile station. In one or more alternative embodiments, network 100 may be in compliant with a Third Generation Partnership Project (3GPP) standard such as a Long Term Evolution (LTE) standard or a Long Term Evolution Advanced (LTE-A) standard. In such embodiments, a base station may be referred to as an enhanced Node B (eNB), and a mobile device may be referred to as user equipment (UE). It is noted that the standards that may be implemented by network 100 are merely examples, and the scope of the claimed subject matter is not limited in this respect.

In one or more embodiments, as shown in FIG. 1, multiple base stations of network 100 may include or otherwise be associated with a mobility anchor function (A) such as mobility anchor 124 collocated with access router 150, mobility anchor 126 collocated with access router 152, and mobility anchor 128 collocated with access router 154 and base station 114. A mobility anchor generally may be considered as associated with a base station when the mobility anchor is collocated with an access router that connects that base station to the network. In some embodiments, base station 110 may connect to network 100 via access router 150 such that mobility anchor 124 may be considered as associated with base station 110. In other embodiments, access router 154 and mobility anchor 128 may be collocated with base station 160 such that mobility anchor 128 is associated with base station 160. By having the mobility anchor functions distributed with multiple devices such as the access routers as shown, network 100 implements a distributed mobility anchor 130 rather than having a centralized mobility anchor. Whenever a mobile device connects to network 100, a mobility anchor will assign an internet protocol (IP) address to the mobile device. In this arrangement, there is no need for a tunnel to be set at this point, and the control traffic for obtaining an IP address does not have to be run through a centralized entity. In such a scheme, mobility of a mobile device between coverage areas of different base stations is handled by the local mobility anchor function at the base station in the event of a handoff from one base station to another. Traffic routing after a mobile device handoff is shown in and described with respect to FIG. 2, below.

Figure 2:
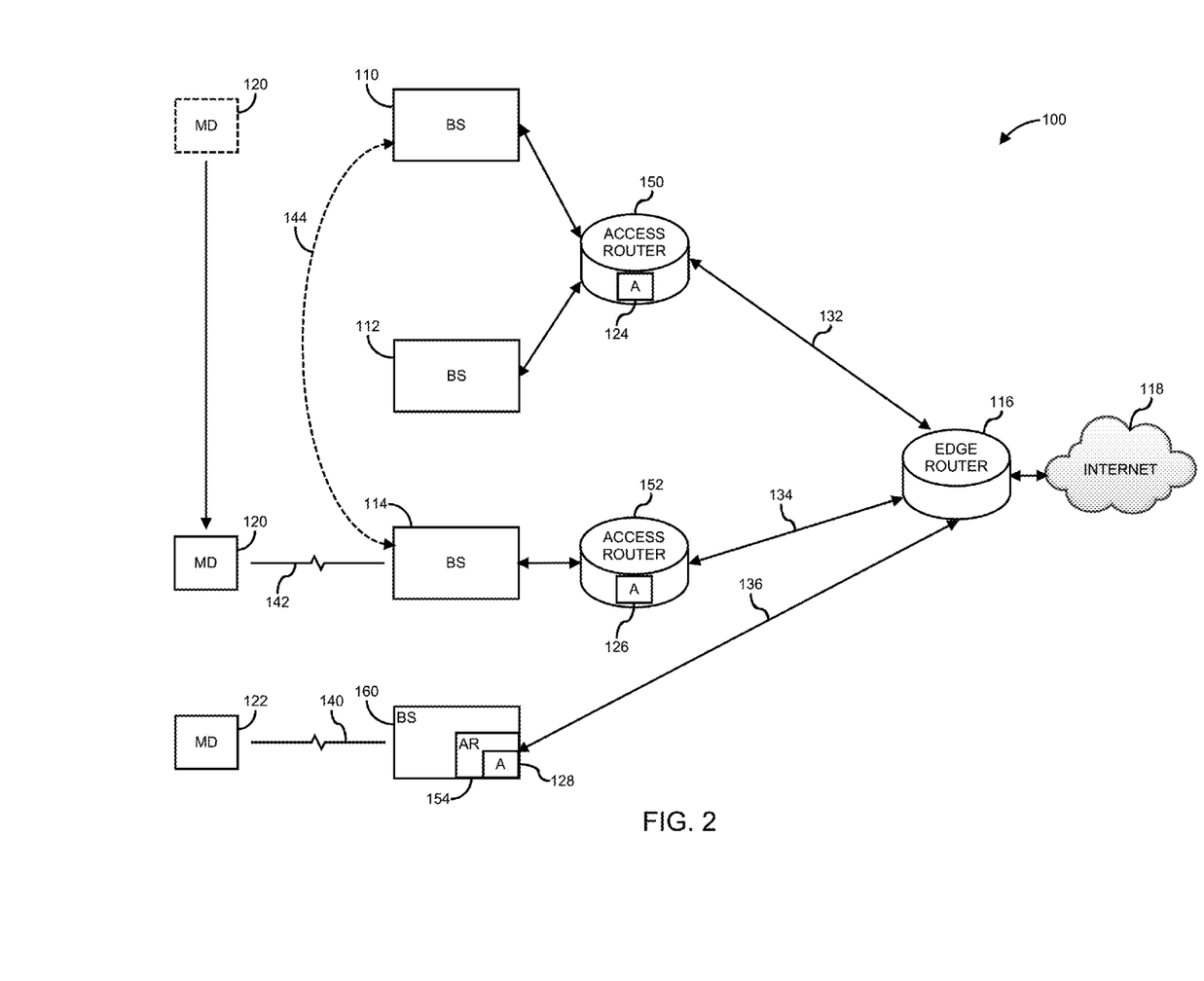
FIG. 2 is a diagram of the wireless network of FIG. 1 illustrating traffic routing after a mobile device handoff in accordance with one or more embodiments.

Referring now to FIG. 2, a diagram of the wireless network of FIG. 1 illustrating traffic routing after a mobile device handoff in accordance with one or more embodiments will be discussed. Initially, mobile device 120 may be connected with base station 110 via wireless link 138 as shown in FIG. 1. At this point, no tunneling is needed, and packets from the Internet 118 that are destined for mobile device 120 may be routed through edge router 116 and access router 150 to base station 110 via link 132 and ultimately to mobile device 120 via wireless link 138 as shown in FIG. 1. As shown in FIG. 2, when mobile device 120 moves from the coverage area of base station 110 to the coverage area of base station 114, mobile device 120 communicates with base station 114 via mobile link 142. At this point, a tunnel 144 is created between mobility anchor 124 and mobility anchor 126. In such arrangement, if the two base stations, the original base station and the destination base station, are coupled to the same access router, then no IP address change is needed when the mobile device 120 hands off from one base station to another, and no tunnel is needed. However, if the original base station and the destination base station are coupled to different access routers, then the network address changes resulting in a need for an IP address change, and tunneling is needed. In the example shown in FIG. 2, since the original base station, base station 110, is connected to access router 150, and the destination base station, base station 114, is connected to access router 152, a tunnel 144 is created between base station 110 and base station 114 to account for the IP address change. Traffic arriving from the Internet 118 that is destined for mobile device 120 will continue to be forwarded by edge router 116 and access router 150 where it will be encapsulated by the collocated mobility anchor 124. As a result of encapsulation, mobility anchor 124 forwards the packet to access router 152 via tunnel 144 where it is decapsulated by mobility anchor 126 which is collocated with access router 152. The packet is then forwarded to mobile device 120 via base station 114. A tunnel such as tunnel 144 is formed by the ability to encapsulate and decapsulate packets, an ability which exists in the mobility anchor functions. In some embodiments, the mobility anchor function may be collocated in a base station such as base station 160, but such an arrangement is optional. Packets originated by mobile device 120 will follow the same path in reverse order to the new base station, base station 114, access router 152, to original access router 150 via tunnel 144, to edge router 116 to be routed over the Internet 118.

In one or more embodiments, a distributed mobility anchor 130 function as shown in FIG. 1 may allow IP address assignment to be performed locally by a respective mobility anchor 124, mobility anchor 126, or mobility anchor 128, in a distributed manner which allows network 100 to handle more IP assignment requests per unit time since IP address assignment does not need to be performed by a central entity and therefore avoids having a single point of failure. Furthermore, no tunneling is involved for the initial assignment of IP addresses. In addition, when no handoff occurs there is no tunneling overhead, defined as computing and/or bandwidth resources, as would otherwise be involved with a centralized mobility anchor point. Even when a handoff occurs, mobility anchoring does not need to occur at a central mobility anchor point, resulting in lower tunneling overhead. Furthermore, utilization of a distributed mobility anchor function does not involve routing all traffic through a single device. In some embodiments, the base stations of network 100 may be connected to different ports of edge router 116, and/or through different edge routers.

In one or more embodiments, routing of traffic through network 100 using a distributed mobility anchor 130 may be optimized by optimizing a mobility anchor selection. Optimized mobility anchor selection may be performed by collecting information about the movement behavior of the mobile devices. For example, if a particular mobile device is connected most of the time through the same base station, and hence it is located within the same geographic location, the mobility anchor coupled with that base station will be assigned as the mobility anchor for that mobile device, even when the mobile device initially connects to network 100 through a different base station. Alternatively, the decision to assign a mobility anchor for a mobile device may be based on optimizing the amount of data the mobile device transfers through a given access router rather than being based on connection time. In either case, a tunnel may be created between a mobility anchor that is coupled with the base station to which a mobile device is currently connected and the mobility anchor assigned as the mobility anchor for the mobile device. Since according to the mobility pattern based on time or traffic it is likely that the mobile device will move to the area covered by its assigned mobility anchor, the tunnel will eventually no longer be needed. Thus, even though a mobile device may connect to a base station that is not coupled with the assigned mobility anchor assigned as the mobility anchor point for the base station, traffic on the network may be optimized since the mobile device will eventually connect to its optimized base station and mobility anchor. Another way of optimizing network traffic using distributed mobility anchor 130 may involve tracking the tunneling overhead on each access router and selecting a less loaded or the least loaded access router (and collocated mobility anchor) as the mobility anchor for the mobile device. Various other methods may be implemented to optimize traffic on network 100 using distributed mobility anchor 130 functions, for example a combination of time, traffic, and or tunneling overhead, and the scope of the claimed subject matter is not limited in this respect. In one or more embodiments, a hybrid mobility anchor scheme may be implemented as shown in and described with respect to FIG. 3, below.

Figure 3:
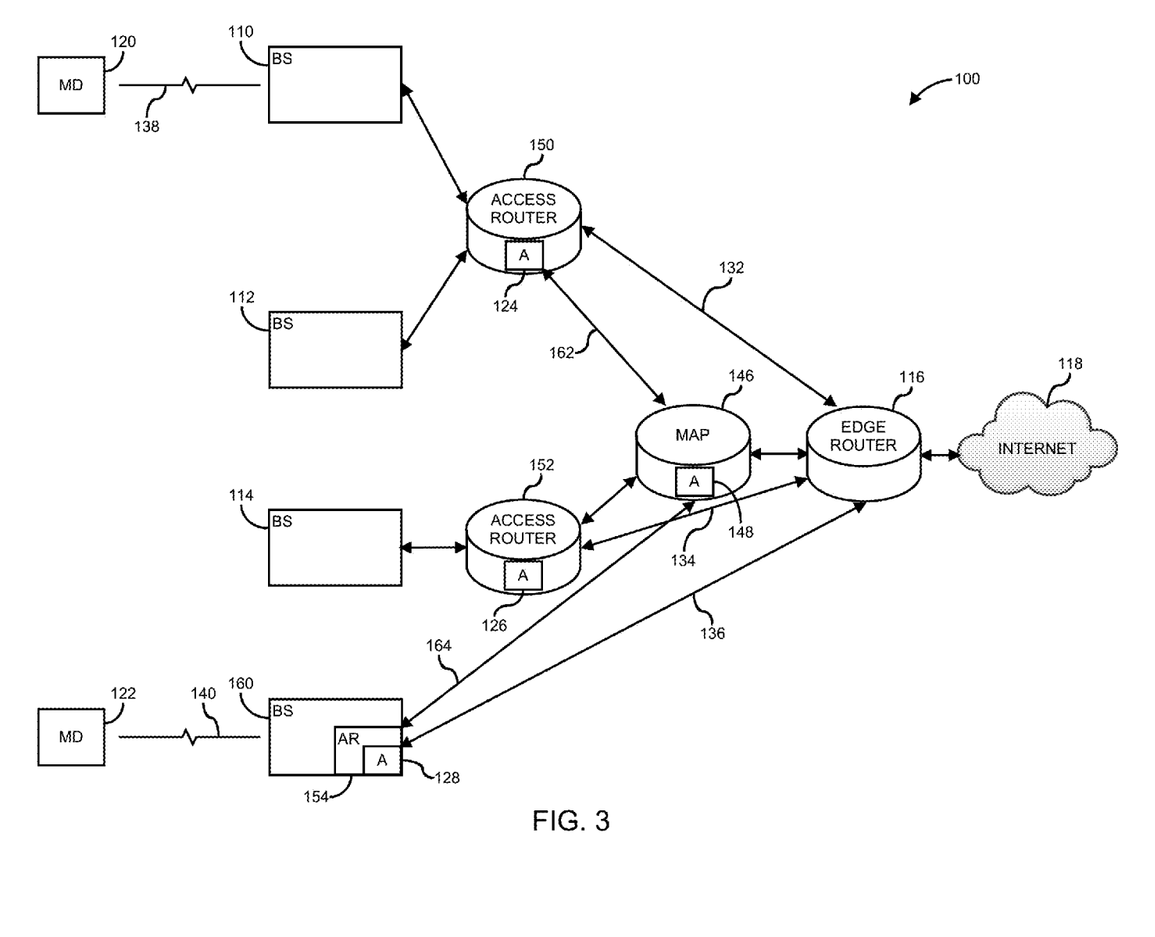
FIG. 3 is a diagram of a wireless network including hybrid mobility anchor functionality in accordance with one or more embodiments.

Referring now to FIG. 3, a diagram of a wireless network including hybrid mobility anchor functionality in accordance with one or more embodiments will be discussed. As shown in FIG. 3, a hybrid mobility anchor scheme that is a merger between a centralized mobility anchor function and a distributed mobility anchor function as shown in FIG. 1 and FIG. 2 may be implemented on network 100. In such an arrangement, mobile devices that are not really mobile and which are essentially always or nearly always connected to network 100 through the same base station may be anchored to the mobility anchor which is collocated with the base station and/or access router to which the mobile device connects. Mobile devices that have an identified mobility pattern with a high likelihood to be connected with a specific base station will be anchored to the distributed mobility anchor collocated with that specific base station and/or the respective access router. Mobile devices that are highly mobile and which have no identified base station to which they are likely to be connected will be anchored by a centralized mobility anchor point (MAP) 146 which includes its own mobility anchor function 148. Alternatively, highly mobile devices may be anchored with a lesser loaded or the least loaded distributed mobility anchor.

In a hybrid mobility anchor scheme as shown in FIG. 3, the base stations may be connected to the centralized MAP 146 and to edge router 116 through a respective access router. If a mobile device, such as mobile device 120, is anchored to centralized MAP 146 and connected to a base station, such as base station 110, then traffic from mobile device 120 will flow from base station 110 via access router 150 to centralized MAP 146 through tunnel 162 on its way to edge router 116 and the Internet 118. If mobile device 120 is instead connected to base station 110 and anchored by mobility anchor 124 of access router 150, then traffic from mobile device 120 will flow directly to edge router 116 via link 132 without having to pass through centralized MAP 146. Likewise, if mobile device 122 is anchored to centralized MAP 146 and connected to base station 160, then traffic from mobile device 122 may be routed to centralized MAP 146 via tunnel 164 and then to edge router 116. If mobile device 122 is instead connected to base station 160 and anchored by distributed mobility anchor 128 that is collocated with base station 160, then traffic from mobile device 122 will flow directly to edge router 116 via link 136 without having to pass through centralized MAP 146. Similarly as shown in and described with respect to FIG. 1 and FIG. 2, above, if a mobile device is connected to a first base station and moves to the coverage area of a second base station coupled with a different access router, to accommodate the handoff a tunnel may be set up between the first base station and the second base station to handle the routing of traffic. A flow diagram of a method for implementing a mobile device handoff using distributed mobility anchor functionality is shown in and described with respect to FIG. 4, below.

Figure 4:
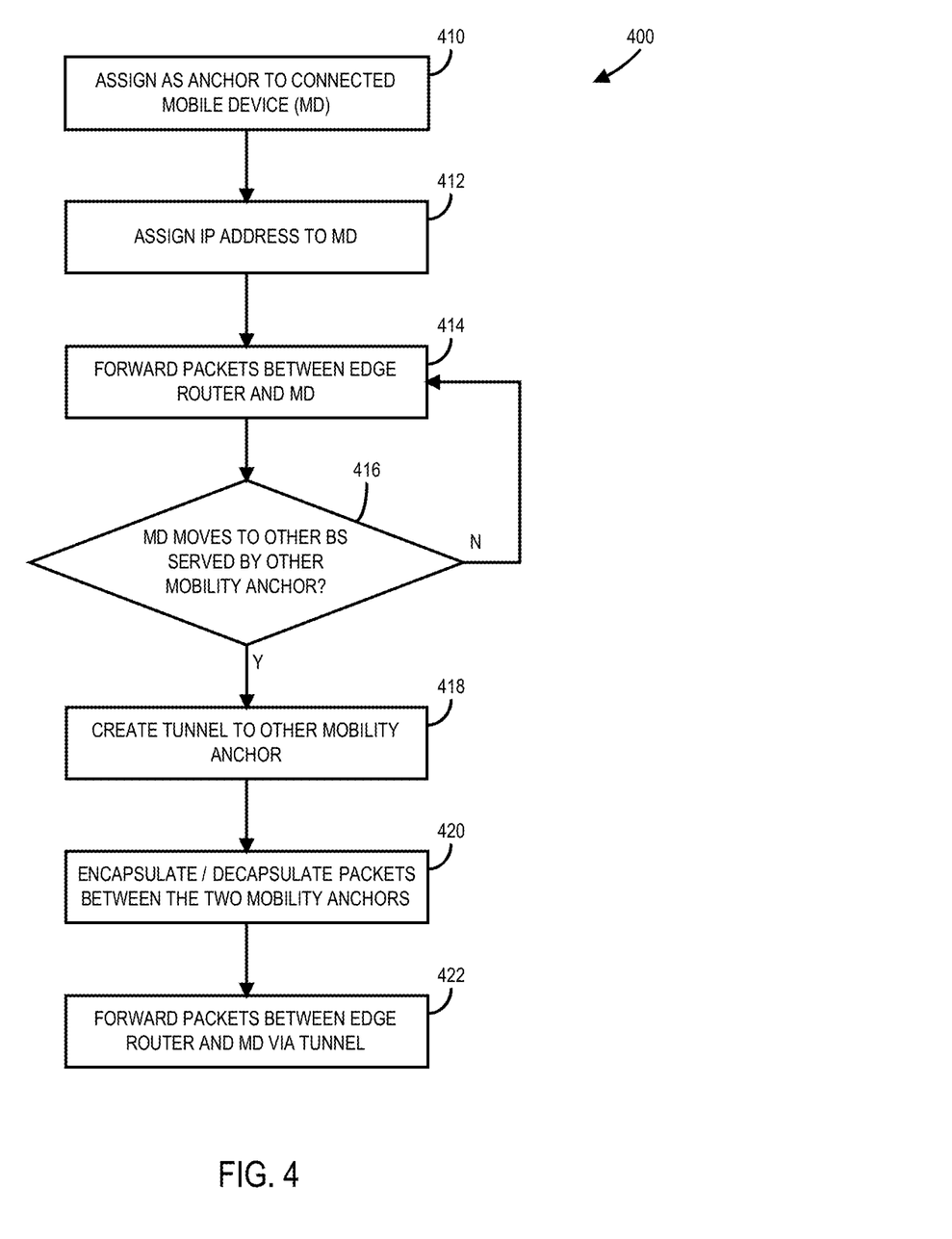
FIG. 4 is a flow diagram of a method to implement a mobile device handoff using distributed mobility anchor functionality in accordance with one or more embodiments.

Referring now to FIG. 4, a flow diagram of a method to implement a mobile device handoff using distributed mobility anchor functionality in accordance with one or more embodiments will be discussed. Although FIG. 4 shows one particular order of the blocks of method 400, various other orders of blocks may be provided, with more or fewer blocks, in other embodiments, and the scope of the claimed subject matter is not limited in these respects. At block 410 a mobility anchor is assigned to be the mobility anchor of a mobile device that connects to the network via a base station that is connected to that mobility anchor. The mobility anchor could be either collocated with that particular base station or collocated with an access router to which the base station is connected. At block 412 the mobility anchor that is collocated with the base station and/or the access server assigns an Internet Protocol (IP) address to the mobile device. At block 414, as the serving base station corresponding to the anchor point for the mobile device, the base station forwards packets between the mobile device and edge router 116 of network 100. A determination may be made at decision block 416 whether the mobile device moves from the present serving base station to the coverage area of another base station served by another mobility anchor. If the mobile device has not moved to another base station and maintains a connection to the present serving base station, then the present serving base station will continue to forward packets between edge router 116 and the mobile device.

If the mobile device does move to the coverage area of another base station served by another mobility anchor, and the mobile device makes a connection to the other base station coupled with a new access router, the mobility anchor that is functioning as the anchor for the mobile device and that is collocated with the original base station will create at tunnel at block 418 to the other mobility anchor that is collocated with the base station and/or access router to which the mobile device is now connected. At block 420 the mobility anchor that is collocated with the original base station functioning as the anchor for the mobile device will then encapsulate and/or decapsulate packets transferred between edge router 116 and the other base station that are sent to and/or received from the mobile device. In such an arrangement, the mobile device may continue to use the IP address that was assigned to it at block 412, and routing of packets will be handled via the encapsulation and/or decapsulation of the packets. Packets destined for the mobile device from edge router 116 will be forwarded to the original base station. The anchor co-located with the base station will encapsulate those packets and forward the packets to the new base station to which the mobile station is now connected, and the anchor that is collocated with the new base station and/or access router will decapsulate the packets and the base station will transmit the decapsulated packets to the mobile device. Packets transmitted by the mobile device to the new base station will be encapsulated by the mobility anchor that is collocated with the new base station and/or access router and forwarded to the anchor that is collocated with the original base station and/or access router. The anchor that is collocated with the original base station and/or access router will then decapsulate those packets and forward them to edge router 116 for transmission to their destination via Internet 118. Using this procedure, packets are transferred at block 422 between edge router 116 and mobile device via the tunnel that was established at block 418 between the original mobility manager and the new mobility manger to which the base station is connected.

Figure 5:
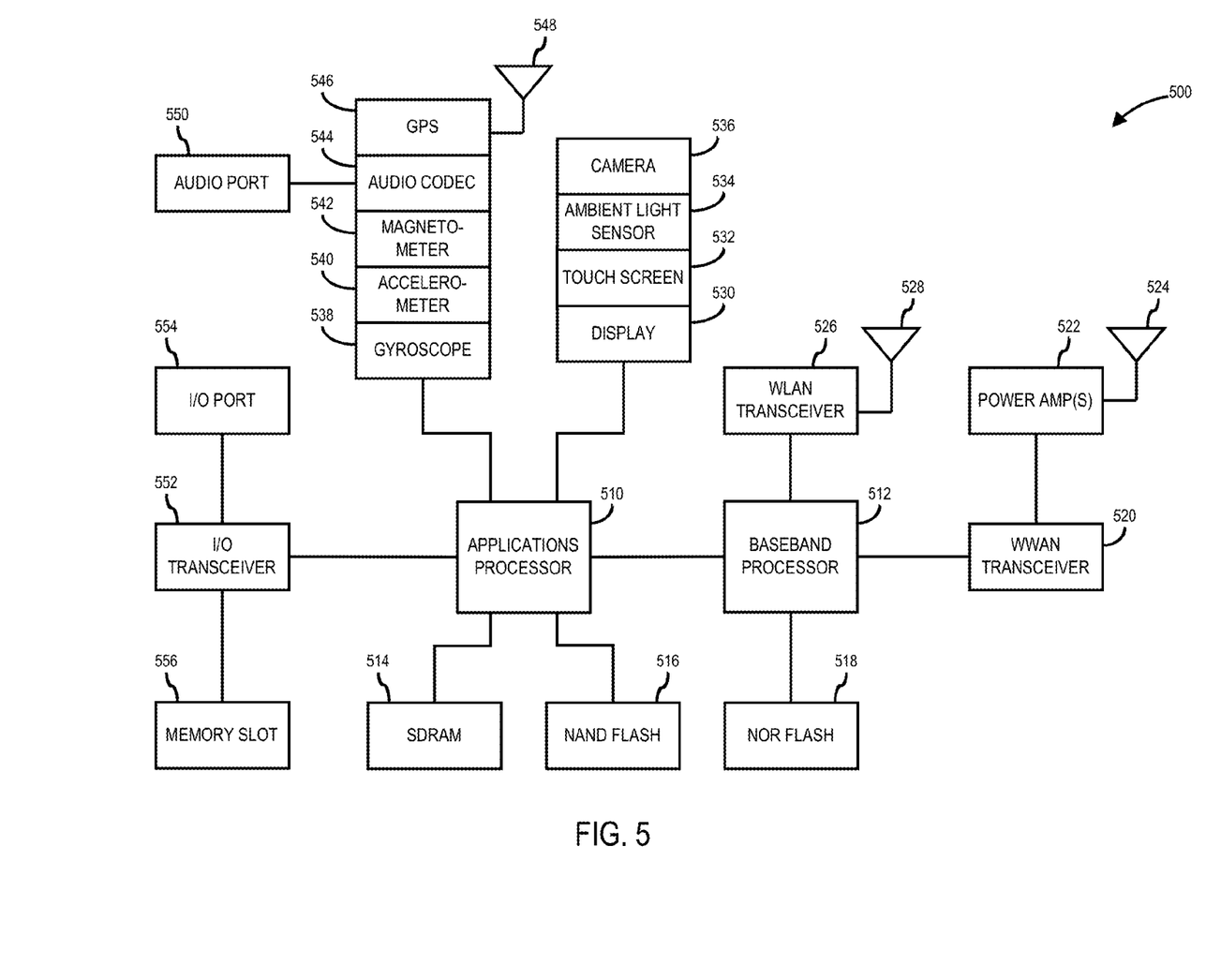
FIG. 5 is a block diagram of an information handling system capable of operating in a wireless network with distributed mobility anchor functionality in accordance with one or more embodiments.

Referring now to FIG. 5, a block diagram of an information handling system capable of operating in a wireless network with distributed mobility anchor functionality in accordance with one or more embodiments in accordance with one or more embodiments will be discussed. Information handling system 500 of FIG. 5 may tangibly embody any one or more of the elements of network 100 of FIG. 1, FIG. 2 or FIG. 3 including for example base station 110, base station 112, base station 114, edge router 116, mobile device 120, mobile device 122, access router 150 and/or access router 152 with greater or fewer components depending on the hardware specifications of the particular device. Although information handling system 500 represents one example of several types of computing platforms, information handling system 500 may include more or fewer elements and/or different arrangements of elements than shown in FIG. 5, and the scope of the claimed subject matter is not limited in these respects.

In one or more embodiments, information handling system 500 may include an applications processor 510 and a baseband processor 512. Applications processor 510 may be utilized as a general-purpose processor to run applications and the various subsystems for information handling system 500. Applications processor 510 may include a single core or alternatively may include multiple processing cores wherein one or more of the cores may comprise a digital signal processor or digital signal processing (DSP) core. Furthermore, applications processor 510 may include a graphics processor or coprocessor disposed on the same chip, or alternatively a graphics processor coupled to applications processor 510 may comprise a separate, discrete graphics chip. Applications processor 510 may include on board memory such as cache memory, and further may be coupled to external memory devices such as synchronous dynamic random access memory (SDRAM) 514 for storing and/or executing applications during operation, and NAND flash 516 for storing applications and/or data even when information handling system 500 is powered off. In one or more embodiments, instructions to operate or configure the information handling system 500 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 512 may control the broadband radio functions for information handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example for communicating via a 3GPP LTE or LTE-Advanced network or the like.

In general, WWAN transceiver 520 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 520 couples to one or more power amps 522 respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for applications processor 510 and baseband processor 512, and the scope of the claimed subject matter is not limited in these respects. For example, any one or more of SDRAM 514, NAND flash 516 and/or NOR flash 518 may comprise other types of memory technology such as magnetic memory, chalcogenide memory, phase change memory, or ovonic memory, and the scope of the claimed subject matter is not limited in this respect.

In one or more embodiments, applications processor 510 may drive a display 530 for displaying various information or data, and may further receive touch input from a user via a touch screen 532 for example via a finger or a stylus. An ambient light sensor 534 may be utilized to detect an amount of ambient light in which information handling system 500 is operating, for example to control a brightness or contrast value for display 530 as a function of the intensity of ambient light detected by ambient light sensor 534. One or more cameras 536 may be utilized to capture images that are processed by applications processor 510 and/or at least temporarily stored in NAND flash 516. Furthermore, applications processor may couple to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information handling system 500. Alternatively, controller 546 may comprise a Global Navigation Satellite System (GNSS) controller. Audio CODEC 544 may be coupled to one or more audio ports 550 to provide microphone input and speaker outputs either via internal devices and/or via external devices coupled to information handling system via the audio ports 550, for example via a headphone and microphone jack. In addition, applications processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory such as secure digital (SD) card or a subscriber identity module (SIM) card, although the scope of the claimed subject matter is not limited in these respects.

Figure 6:
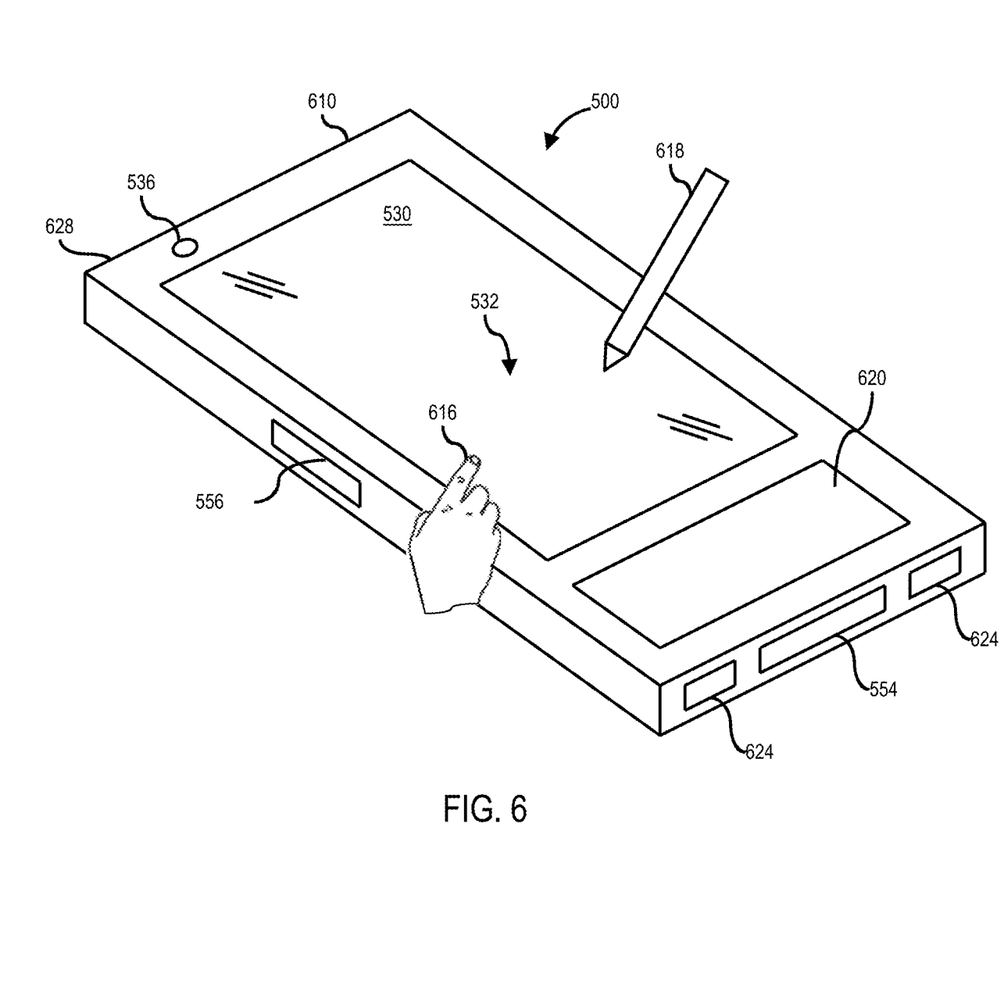
FIG. 6 is an isometric view of an information handling system of FIG. 5 that optionally may include a touch screen in accordance with one or more embodiments.

Referring now to FIG. 6, an isometric view of an information handling system of FIG. 5 that optionally may include a touch screen in accordance with one or more embodiments will be discussed. FIG. 6 shows an example implementation of information handling system 500 of FIG. 5 tangibly embodied as a cellular telephone, smartphone, or tablet type device or the like. The information handling system 500 may comprise a housing 610 having a display 530 which may include a touch screen 532 for receiving tactile input control and commands via a finger 616 of a user and/or a via stylus 618 to control one or more applications processors 510. The housing 610 may house one or more components of information handling system 500, for example one or more applications processors 510, one or more of SDRAM 514, NAND flash 516, NOR flash 518, baseband processor 512, and/or WWAN transceiver 520. The information handling system 500 further may optionally include a physical actuator area 620 which may comprise a keyboard or buttons for controlling information handling system via one or more buttons or switches. The information handling system 500 may also include a memory port or slot 556 for receiving non-volatile memory such as flash memory, for example in the form of a secure digital (SD) card or a subscriber identity module (SIM) card. Optionally, the information handling system 500 may further include one or more speakers and/or microphones 624 and a connection port 554 for connecting the information handling system 500 to another electronic device, dock, display, battery charger, and so on. In addition, information handling system 500 may include a headphone or speaker jack 628 and one or more cameras 536 on one or more sides of the housing 610. It should be noted that the information handling system 500 of FIG. 6 may include more or fewer elements than shown, in various arrangements, and the scope of the claimed subject matter is not limited in this respect.

The following examples may be utilized in any one or more embodiments. In one example, an information handling system comprises a processor and a memory coupled to the processor. Instructions in the memory configure the processor to select a mobility anchor point for a mobile device in a distributed mobility anchor point network, the processor being configured to collect information about movement behavior of a mobile device in the network and assign a mobility anchor point associated with a first base station to the mobile device if the mobile device is connected to the first base station for at least a predetermined amount of time. In a second example, the mobility anchor point associated with the first base station is assigned to the mobile device even if the mobile device initially connects to the network via another base station different than the first base station. In a third example, the processor is further configured to assign a mobility anchor point associated with an initial base station via which the mobile device initially connects to the network in the event mobile device does not connect to the first base station for a at least the predetermined amount of time. In a fourth example, the mobility anchor point associated with the first base station is collocated with the first base station. In a fifth example, the mobility anchor point associated with the first base station is collocated with an access router coupled with the first base station.

In a sixth example, an information handling system comprises a processor and a memory coupled to the processor. Instructions in the memory configure the processor to select a mobility anchor point for a mobile device in a distributed mobility anchor point network, the processor being configured to collect information about data transfer behavior of a mobile device in the network, and assign a mobility anchor point associated with a first base station to the mobile device if the mobile device transfers at least a predetermined amount of data via the first base station. In a seventh example, the mobility anchor point associated with the first base station is assigned to the mobile device even if the mobile device initially connects to the network via another base station different than the first base station. In an eighth example, the processor is further configured to assign a mobility anchor point associated with an initial base station via which the mobile device initially connects to the network in the event the mobile device does transfer at least the predetermined amount of data via the first base station. In a ninth example, the mobility anchor point associated with the first base station is collocated with the first base station. In a tenth example, the mobility anchor point associated with the first base station is collocated with an access router that connects the first base station to the network.

In an eleventh example, an information handling system comprises a processor and a memory coupled to the processor. Instructions in the memory configure the processor to select a mobility anchor point for a mobile device in a distributed mobility anchor point network, the processor being configured to collect information about tunneling overhead of two or more base stations of the network and assign a mobility anchor point associated with a first base station to the mobile device if a tunneling overhead of the first base station is less than a predetermined level. In a twelfth example, the mobility anchor point associated with the first base station is assigned to the mobile device even if the mobile device initially connects to the network via another base station different than the first base station. In a thirteenth example, the processor is further configured to assign a mobility anchor point associated with an initial base station via which the mobile device initially connects to the network in the tunneling overhead of the first base station is not less than a predetermined level. In a fourteenth example, the processor is further configured to otherwise assign a mobility anchor point associated with a second base station to the mobile device if a tunneling overhead of the second base station is lower than the tunneling overhead of the first base station. In a fifteenth example, the mobility anchor point associated with the first base station is collocated with the first base station. In a sixteenth example, the mobility anchor point associated with the first base station is collocated with an access router that connects the first base station to the network.

In a seventeenth example, an information handling system comprises a processor and a memory coupled to the processor. Instructions in the memory configure the processor to select a mobility anchor point for a mobile device in a distributed mobility anchor point network, the processor being configured to collect information about movement behavior of a mobile device in the network, if the mobile device is not mobile for at least a predetermined amount of time, assign a mobility anchor point associated with any base station via which the mobile device connects to the network, and if the mobile device is mobile for at least the predetermined amount of time, assign a mobility anchor point associated with an identified base station via which the mobile device connects to the network with at least a predetermined frequency. In an eighteenth example, the processor is further configured to, if the mobile device is mobile for at least the predetermined amount of time, but there is no identified base station via which the mobile device connects to the network with at least the predetermined frequency, assign a centralized mobility anchor point to the mobile device. In a nineteenth example, the processor is further configured to, if the mobile device is mobile for at least the predetermined amount of time, but there is no identified base station via which the mobile device connects to the network with at least the predetermined frequency, assign to the mobile device a mobility anchor point associated with a base station having a tunneling load below a predetermined amount of tunneling. In a twentieth example, the processor is further configured to, if the mobile device connects to the network via a new base station having associated with a different mobility anchor point, create a tunnel between a base station associated with the assigned mobility anchor point and the new base station.

Although the claimed subject matter has been described with a certain degree of particularity, it should be recognized that elements thereof may be altered by persons skilled in the art without departing from the spirit and/or scope of claimed subject matter. It is believed that the subject matter pertaining to distributed mobility anchoring for wireless networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:
1. An information handling system, comprising:
a processor; and
a memory coupled to the processor, wherein instructions in the memory configure the processor to select a mobility anchor point for a mobile device in a distributed mobility anchor point network, the processor being configured to:

collect information about data transfer behavior of a mobile device in the network; and assign a mobility anchor point associated with a first base station to the mobile device if the mobile device transfers at least a predetermined amount of data via the first base station.

2. An information handling system as claimed in claim 1, wherein the mobility anchor point associated with the first base station is assigned to the mobile device even if the mobile device initially connects to the network via another base station different than the first base station.

3. An information handling system as claimed in claim 1, wherein the processor is further configured to assign a mobility anchor point associated with an initial base station via which the mobile device initially connects to the network in the event the mobile device does transfer at least the predetermined amount of data via the first base station.

4. An information handling system as claimed in claim 1, wherein the mobility anchor point associated with the first base station is collocated with the first base station.

5. An information handling system as claimed in claim 1, wherein the mobility anchor point associated with the first base station is collocated with an access router that connects the first base station to the network.

6. An article of manufacture comprising a non-transitory storage medium having instructions stored thereon that, if executed by a processor, result in:

collecting information about data transfer behavior of a mobile device in a distributed mobility anchor point network; and assigning a mobility anchor point associated with a first base station to the mobile device if the mobile device transfers at least a predetermined amount of data via the first base station.

7. An article of manufacture as claimed in claim 6, wherein the mobility anchor point associated with the first base station is assigned to the mobile device even if the mobile device initially connects to the network via another base station different than the first base station.

8. An article of manufacture as claimed in claim 6, wherein the instructions, if executed, further result in assigning a mobility anchor point associated with an initial base station via which the mobile device initially connects to the network in the event the mobile device does transfer at least the predetermined amount of data via the first base station.

9. An article of manufacture as claimed in claim 6, wherein the mobility anchor point associated with the first base station is collocated with the first base station.

10. An article of manufacture as claimed in claim 6, wherein the mobility anchor point associated with the first base station is collocated with an access router that connects the first base station to the network.

11. A method to select a mobility anchor point for a mobile device in a distributed mobility anchor point network, comprising:

collecting information about data transfer behavior of the mobile device in the distributed mobility anchor point network; and assigning a mobility anchor point associated with a first base station to the mobile device if the mobile device transfers at least a predetermined amount of data via the first base station.

12. A method as claimed in claim 11, wherein the mobility anchor point associated with the first base station is assigned to the mobile device even if the mobile device initially connects to the network via another base station different than the first base station.

13. A method as claimed in claim 11, further comprising assigning a mobility anchor point associated with an initial base station via which the mobile device initially connects to the network in the event the mobile device does transfer at least the predetermined amount of data via the first base station.

14. A method as claimed in claim 11, wherein the mobility anchor point associated with the first base station is collocated with the first base station.

15. A method as claimed in claim 11, wherein the mobility anchor point associated with the first base station is collocated with an access router that connects the first base station to the network.

* * * * *